United States Patent [19]

Sakamura et al.

[11] Patent Number: 4,777,424

[45] Date of Patent: Oct. 11, 1988

[54] BATTERY CHARGER

[75] Inventors: Yoshinobu Sakamura; Makoto Tanimizu, both of Hikone, Japan

[73] Assignee: Matsushita Electric Works, Ltd., Osaka, Japan

[21] Appl. No.: 904,593

[22] Filed: Sep. 8, 1986

[30] Foreign Application Priority Data

Sep. 13, 1985 [JP] Japan .................................. 60-203672

[51] Int. Cl.⁴ .............................................. H02J 7/00
[52] U.S. Cl. ........................................ 320/21; 320/39;
320/DIG. 1; 363/21
[58] Field of Search ............... 320/21, 39, 40, DIG. 1;
323/222, 906; 307/45; 363/21, 59

[56] References Cited

U.S. PATENT DOCUMENTS

| | | | |
|---|---|---|---|
| 4,021,717 | 5/1977 | Furuishi et al. | 320/21 X |
| 4,253,137 | 2/1981 | Rao | 363/21 |
| 4,327,405 | 4/1982 | Clark, Jr. | 363/21 |
| 4,553,196 | 11/1985 | Tokuyama et al. | 363/21 |

FOREIGN PATENT DOCUMENTS

| | | |
|---|---|---|
| 41202A1 | 6/1980 | Fed. Rep. of Germany . |
| 2924631 | 1/1981 | Fed. Rep. of Germany ...... 323/222 |
| 2087113 | 10/1981 | United Kingdom . |

Primary Examiner—Patrick R. Salce
Assistant Examiner—Anita M. Ault

[57] ABSTRACT

An improved battery charger for charging a battery from a dc power source includes a DC-to-DC converter comprising a transformer and a switching transistor connected in series with the primary winding of the transformer. The transformer has its primary winding connected to the dc power source and has its secondary winding connected to the battery to be charged. The switching transistor is controlled to be alternately turned on and off in order to develop across the secondary winding an induce voltage which is rectified to be applied to the battery for charging the same. The secondary winding of the transformer is electrically connected to the dc voltage source in such a manner that the induced voltage of the transformer is in an additive relation with the terminal voltage of the dc voltage source.

6 Claims, 4 Drawing Sheets

BATTERY CHARGER

BACKGROUND OF THE INVENTION

1. Field of the Invention

The present invention is directed to a battery charger for charging a battery from a dc power source, and more particularly to a battery charger incorporating a DC-to-DC voltage converter for charging a battery from a dc voltage power source that may have a terminal voltage equal to or less than the nominal rated voltage to be charged.

2. Description of the Prior Art

As a result of the extensive use of portable apparatus powered by an incorporated rechargeable battery, there have been increased demands for charging the battery from a dc power source such as an automobile battery readily available at outdoor locations. However, in recent years, it is not uncommon to power the apparatus by a battery having the nominal rated voltage equal to or greater than the terminal voltage of the automobile battery. To this end, there have been proposed a prior battery charger utilizing a step-up transformer for charging a battery from a lower dc voltage source, for example, as shown in U.S. Pat. No. 3,594,627. The step-up transformer employed in the prior battery charger has a primary winding coupled to the dc voltage source through a switching transistor, a secondary winding coupled to the battery to be charged, and a feedback winding connected in circuit with the switching transistor. The switching transistor is controlled by a suitable oscillation circuit to be alternately turned on and off for developing an induced voltage across the secondary winding of the step-up transformer.

A typical circuit arrangement of the prior battery charger is exemplarily shown in FIG. 8 of the attached drawings for easy understanding of the operation of the prior art charger. In the circuit of FIG. 8, a dc voltage source S is coupled to a battery B to be charged through a step-up transformer T having a primary winding L1, a secondary winding L2, and a feedback winding L3. The primary winding L1 receives the current from the dc voltage source S by the operation of a switching transistor Q. The switching transistor Q is connected in circuit with a starting resistor R1, resistor R2, capacitor C, and the feedback winding L3 to form a blocking oscillator which operates to alternately turn on and off the transistor Q at a suitable frequency. The blocking oscillator supplies an intermittent current to the primary winding L1 of the step-up transformer T which responds to induce an increased voltage across its secondary winding L2. The resulting ac voltage is then rectified by a half-wave rectifier diode D to be applied across the battery B for flowing the charge current to the battery B. However, the circuit arrangement of the above charger has an inherent drawback of amplifying the energy loss significantly with the increase of induced voltage required for charging. This is easily understood from the following equation representing the energy loss Ws in the step-up transformer of the above circuit.

$$Ws = (1-\eta)E_0 I_0 = (1-\eta)E_1 I_1/\eta,$$

where $E_0$ is the terminal voltage of the dc power source S, $I_0$ is the current flowing into the primary winding L1, $E_1$ is the voltage induced across the secondary winding L2, $I_1$ is the charge current to the battery B, and $\eta$ is the transformation efficiency. That is, it is apparent from the above equation that the energy loss Ws is in direct proportion to the induced voltage $E_1$ required. Further, the increase of the induced voltage will require the transformer to be of larger capacity and therefore more bulky and expensive.

SUMMARY OF THE INVENTION

The present invention eliminates the above problem and provides an improved battery charger of unique circuit configuration. The battery charger in accordance with the present invention utilizes a DC-to-DC voltage converter connected between a dc voltage source and a battery to be charged. The voltage converter is of conventional design including a voltage transformer having its primary winding connected to the dc voltage source and its secondary winding connected to the battery through a rectifier. Also included in the converter is switching means which is controlled to be alternately turned on and off for interrupting the current to be fed through the primary winding of the transformer in order to produce an induced voltage across the secondary winding of the transformer. The induced voltage is then rectified by the rectifier to be applied to the battery for flowing the charge current to the battery. The characterizing feature of the present invention resides in that the secondary winding is connected in series with the dc voltage source in such a manner that the induced voltage of the transformer is in an additive relation with the terminal voltage of the dc voltage source. With this result, the voltage from the dc voltage source can be added to the induced voltage for charging the battery, thus permitting the use of a smaller transformer in charging the battery from the dc voltage source having equal or less terminal voltage than the nominal rated voltage of the battery intended to be charged. This greatly reduces the bulk and weight of the transformer as well as the voltage endurance requirements of the other components forming the circuit of the battery charger, and hence the cost of the battery charger.

Accordingly, it is a primary object of the present invention to provide an improved battery charger which is capable of charging the battery from the lower dc voltage source at a minimum transformation loss with the use of a smaller transformer, and capable of being made compact and less costly.

In one form of the present invention, an over-charge indicator is included in the circuit of the battery charger to warn the user of an abnormal and undesirable over-charge condition for immediate ceasing of the charging procedure. The over-charge indicator is a light emitting diode which is connected in circuit together with a half-wave rectifier diode responsible for rectifying the voltage induced across the transformer secondary. The rectifier diode has its anode coupled to one end of the secondary winding and its cathode to the positive side of the battery. The over-charge indicator, or light emitting diode has its anode coupled to the positive side of the battery and its cathode to the other end of the secondary winding so that it can produce an alarm light indicative of current being drawn back to the dc power source from the battery when the latter is over-charged.

It is therefore another object of the present invention to provide an improved battery charger which is capable of monitoring the over-charge condition of the battery to provide a warning indication of such abnormal condition.

In preferred embodiments of the present invention, there is disclosed another advantageous feature of controlling the battery charger in such a manner as to prevent excess charge current from flowing into the battery being charged when the dc voltage source has the terminal voltage higher than the initial voltage level of the battery to be charged. For this purpose, a comparator is included in circuit to compare the instant voltage of the battery being charged with the fixed terminal voltage of the dc voltage source so that it provides an output inhibiting the operation of the DC-to-DC converter or transformer so long as the latter voltage is higher than the former. This allows the direct charging from the dc power source to the battery when the dc voltage source alone is sufficient for affording a charge current to the battery in the initial charging stage, and prevents extra charge current from being added to the charge current available from the dc voltage source and therefore protects the battery from excess charge current flowing thereinto which could otherwise destroy or at least damage the battery.

It is therefore a further object of the present invention to provide an improved battery charger in which the voltage difference between the dc voltage source and the battery intended to be charged can be constantly monitored for allowing the direct charging of the battery from the dc voltage source so long as the latter is sufficient for supplying the charge current and therefore preventing excess charge current from flowing into the battery.

One particular embodiment of the present invention further includes a logical OR gate which is arranged to inhibit the operation of the DC-to-DC converter so long as the terminal voltage of the dc voltage source exceeds the instant voltage of the battery being charged or when the battery is over-charged above its allowed limit. With the inclusion of the logical OR gate, the battery can be free from receiving the excess charge current of harmful nature as well as from being over-charged, which is therefore a still further object of the present invention.

The present invention discloses a further advantageous feature of controlling the DC-to-DC converter in such a feedback manner as to inhibit the operation thereof only when the voltage of the dc voltage source exceeds the instant voltage of the battery being charged and at the same time the charge current flowing into the battery exceeds a predetermined threshold level. This means that, when the battery is initially charged directly from the dc voltage source alone due to the voltage difference therebetween, the DC-to-DC converter can start its operation of adding the induced voltage to the dc voltage source well before the battery has reached into equilibrium with the dc voltage source by suitably selecting the threshold level. If this were not the case, the DC-to-DC converter would remain inoperative until the charge current resulting form the voltage difference alone charges the battery up to the voltage level equal to that of the dc voltage source, eventually causing to elongate considerably the total charging time as the charge current from the dc voltage source alone is ever-decreasing to zero and consequently requires much more time to charge the battery to that extent.

These and still other objects and advantages of the present invention will be more apparent from the following description of the preferred embodiments when taken in conjunction with the accompanying drawings.

DETAILED DESCRIPTION OF THE PREFERRED EMBODIMENT

First Embodiment

Figure 1:
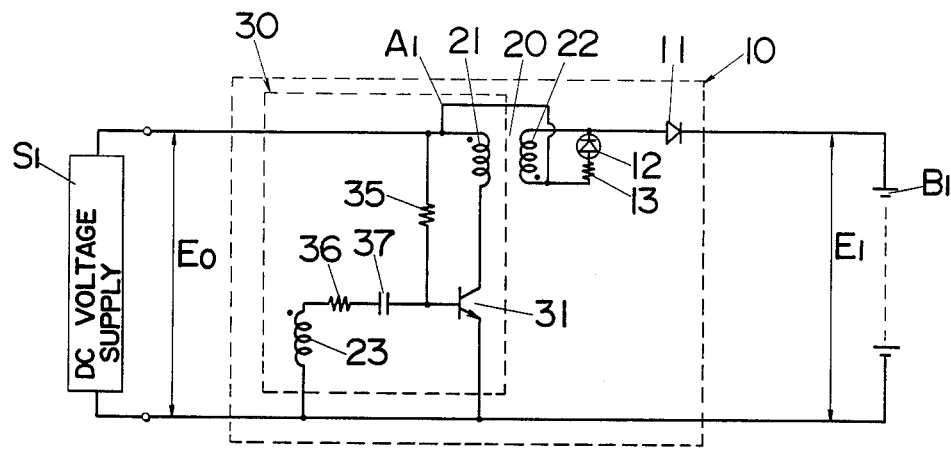
FIG. 1 is a circuit diagram of a battery charger in accordance with a first preferred embodiment of the present invention.

Referring now to FIG. 1, there is shown a battery charger in accordance with the first embodiment of the present invention which may utilizes an automobile battery or floating battery as a dc voltage source for charging a rechargeable battery used in various portable apparatus. The battery charger comprises a DC-to-DC converter 10 connected between the dc voltage source S1 and a rechargeable battery B1 to be charged. The DC-to-DC converter 10 includes a transformer 20 having a primary winding 21 connected to the dc voltage source 1, a secondary winding 22 connected to the battery B1, and a feedback winding 23. Also included in the converter 10 are a switching transistor 31 connected in series with the primary winding 21 of the transformer 20 and a rectifier diode 11 connected between the positive side of the battery B1 and the one end of the secondary winding 22. The switching transistor 31 is cooperative with the primary winding 21, the feedback winding 23, and a R-C network of a starting resistor 35, resistor 36, and capacitor 37 to form a blocking oscillator 30 of known configuration so that the switching transistor 31 is controlled to be alternately turned on and off at a frequency determined by the RC constant of the circuit.

The secondary winding 22 is electrically connected in series with the dc voltage source S1 via a line A1 so that the battery B1 can receive the charge current from the added voltage of the induced voltage plus the dc voltage source S1. In this respect, the transformer 20 employed is a step-down transformer of which output is added to the dc voltage source S1 so as to provide an overall voltage higher than the terminal voltage of the dc voltage source S1. A series combination of a light emitting diode 12 and resistor 13 is connected across the secondary winding 22 with the cathode of the diode 12 connected to the anode of the rectifier diode 11 so that the light emitting diode 12 produces a light in each half cycle of the induced ac voltage developed across the secondary winding 22 or when the induced voltage is in opposite polarity to the dc voltage source S1. Thus, each half cycle in which the induced voltage is not added to the dc voltage source S1 can be best utilized for indication of the charging process in operation.

Figure 8:
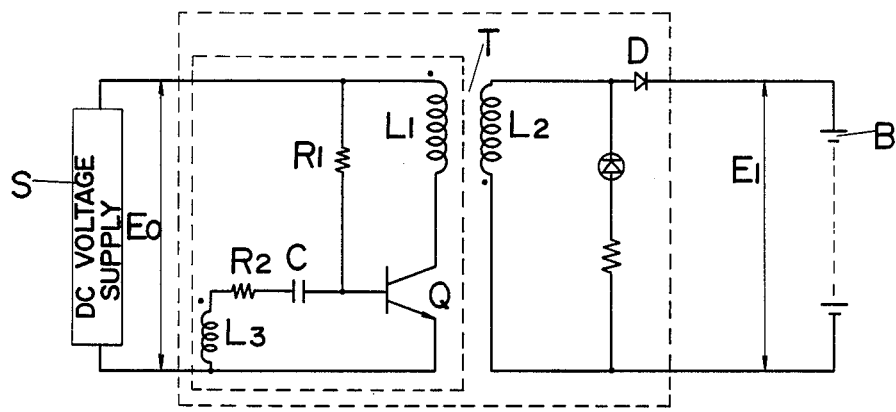
FIG. 8 is a circuit diagram of a prior battery charger.

With this circuit arrangement of utilizing the dc voltage source S1 to be added to the induced voltage for charging the battery B1, the energy loss can be greatly reduced as compared with the prior charger which solely utilizes the induced voltage of the step-up transformer in charging the battery, as shown in FIG. 8. That is, the energy loss Ws' in charging the battery B1 according to the present invention can be represented by the following equation:

$$Ws' = E_0 I_0 - (E_1 - E_0)I_0 = (1 - \eta')E_0 I_0$$
$$= (1 - \eta')(E_1 - E_0)I_1/\eta',$$

where $E_0$ is the terminal voltage of the dc power source S1, $I_0$ is the current flowing into the primary winding L1, $E_1$ is the terminal voltage of the battery B1 being charged and hence $(E_1-E_0)$ is the necessary voltage developed across the secondary winding 22, $I_1$ is the charge current to the battery, and $\eta'$ is the transformation efficiency. Assuming that there is no substantial difference between the values of $\eta'$ of the transformer 20 and the $\eta$ of the transformer in the prior art, the energy loss Ws' will be reduced to $(E_1-E_0)/E_1$ times less than Ws of the prior charger since $E_0 \neq 0$. In this way, the battery charger of the present invention permits efficient charging of the battery with the use of a transformer of less bulk and weight, contributing to more compact and less costly design of the battery charger.

Modification of First Embodiment

Figure 2:
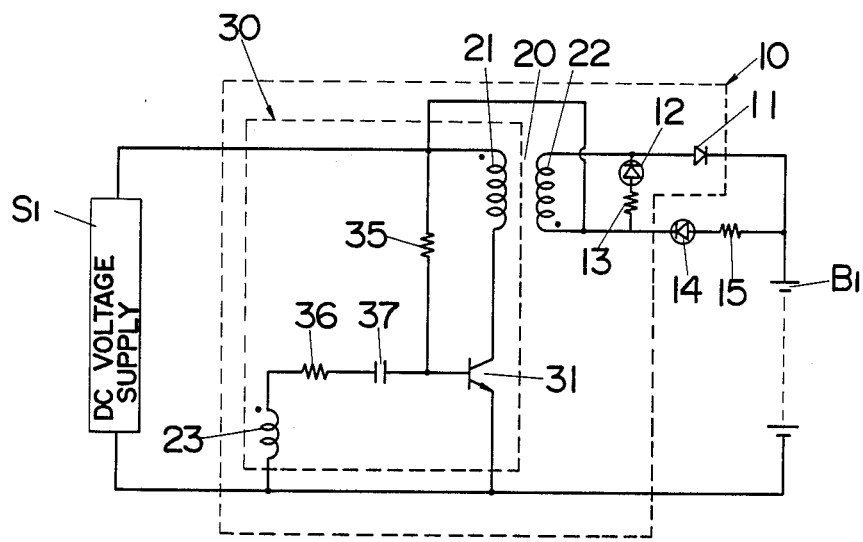
FIG. 2 is a circuit diagram of a modification of the battery charger of FIG. 1.

FIG. 2 shows a circuit diagram of a modification of the first embodiment which is identical in configuration to the first embodiment except for an over-charge indicator 14 introduced for warning the over-charge condition of the battery B1. Like numerals designates like parts. The over-charge indicator 14 is a light emitting diode with its anode connected through a resistor 15 to the positive side of the battery B1 and with its cathode connected to the opposite end of the secondary winding 22 from the end to which the anode of the rectifier diode 11 is connected. When the battery B1 is over-charged above an upper limit determined by the resistor 15, the current will flow back to the dc power source S1 from the battery B1 through the line A1 connecting the secondary winding 22 in series relation to the dc voltage source S1, causing the indicator diode 14 to emit a light indicative of such undesired over-charge condition. This enables the battery charger to constantly monitor the over-charge condition of the battery B1 to be charged only with the use of the series combination of the light emitting diode 14 and resistor 15 both of less costly components, and without employing any additional components of higher cost such as a transistor and zenor diode which could be alternatively used for monitoring the over-charge condition of the battery.

Second Embodiment

Figure 3:
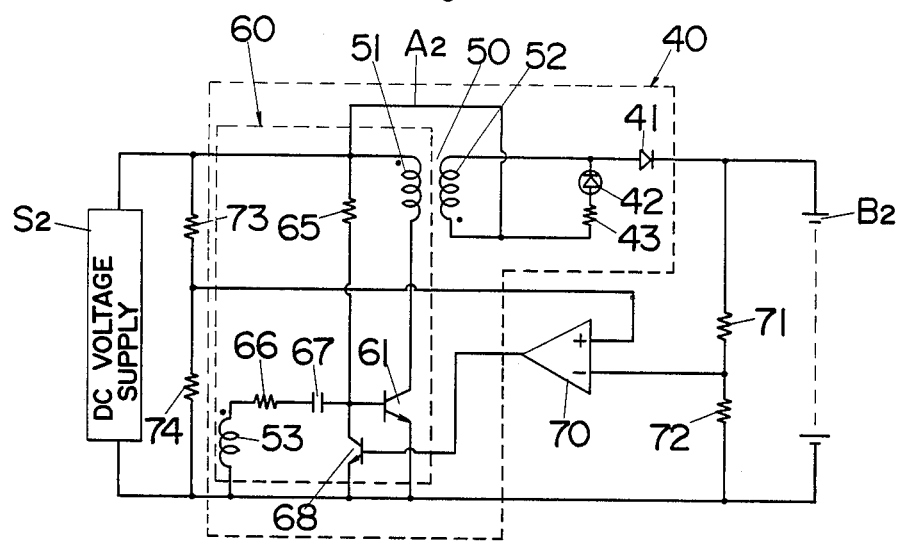
FIG. 3 is a circuit diagram of a battery charger in accordance with a second preferred embodiment of the present invention.

FIG. 3 shows a circuit diagram of a second embodiment of the present invention which is similar to the first embodiment except that a comparator 70 is included for comparison between the terminal voltage of a dc voltage source S2 and the instant voltage of a battery B2 being charged. The battery charger of this embodiment comprising a DC-to-DC converter 40 of the like configuration including a step-down transformer 50 with its primary winding 51 connected to the dc voltage source S2 and with its secondary winding 52 connected through a rectifier diode 41 to the battery B2 to be charged. A switching transistor 61 is connected in circuit with the feedback winding 53 of the transformer 50 and an R-C network of a starting resistor 65, resistor 66, and a capacitor 67 so as to constitute a blocking oscillator 60 of the same operation as in the first embodiment. The secondary winding 52 of the transformer 50 is connected in series with the dc voltage source S2 through a line A2 to add the induced voltage of the transformer 50 thereto.

A first voltage dividing network consisting of a pair of resistors 71 and 72 connected across the battery B2 provides a first output indicative of the instant battery voltage to the inverted input of the comparator 70, while a second voltage dividing network consisting of a pair of resistors 73 and 74 connected across the dc voltage source S2 provides a second output indicative of the dc supply voltage to the non-inverted input of the comparator 70. When the terminal voltage of the dc voltage supply S2 is higher than the instant voltage of the battery B2, the comparator 70 provides a high-level signal to the base of a shunting transistor 68 connected in the base-emitter path of the switching transistor 61, which high-level signal biases the shunting transistor 68 conductive to thereby render the switching transistor 61 nonconductive for inhibiting the the operation of the DC-to-DC converter 40, or the oscillation of the blocking oscillator 60. Upon this occurrence, the transformer 50 no longer develops the induced voltage so that only the charge current due to the voltage difference between the higher dc voltage source S2 and the battery B2 will flow into the battery B2 to advance the charging until the voltage of battery B2 reaches the same voltage level of the dc voltage source S2. Once the battery B2 is charged up to the voltage equal to that of the dc voltage source S2, the DC-to-DC converter 40 becomes operative to add the induced voltage of the transormer 80 to the dc voltage source S2 for affording the charge current to be supplied to the battery B2.

Figure 4:
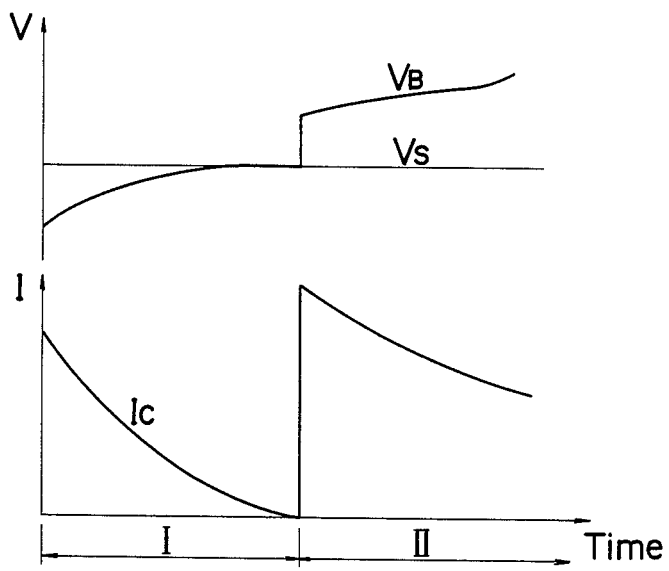
FIG. 4 is a waveform chart indicating the operation of the circuit of FIG. 3.

The above operations are illustrated in the timing charts of FIG. 4 in which the charge current Ic initially drawn due to the voltage difference between the dc ltage source S2 and the battery B2 gradually decreases to zero as the battery B2 is charged up to the same level of the dc voltage source S2 (stage I). The charge current Ic then rapidly increases to its maximum upon starting of the DC-to-DC converter 40 and subsequently decreases gradually as the battery B2 is further charged up to a higher voltage level than that of the dc voltage source S2 (stage II). This scheme allows the direct charging from the dc voltage source S2 to the battery B2 without using the DC-to-DC converter 40 when there is a significant difference between the terminal voltage of the dc voltage source S2 and the instant voltage of the battery B2, whereby protecting the battery B2 from receiving an excessively large charge current which would be likely if the induced voltage be applied in the presence of such significant voltage difference and would consequently destroy or at least damage the battery B2.

Modification of Second Embodiment

Figure 5:
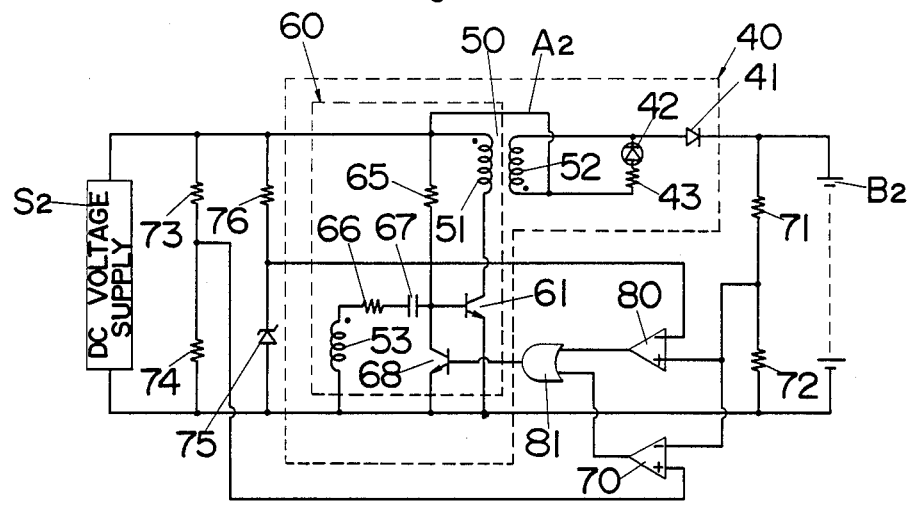
FIG. 5 is a circuit diagram of a modification of the battery charger of FIG. 3.

FIG. 5 shows a modification of the second embodiment which is identical in configuration to the second embodiment except that gate means is included for inhibiting the DC-to-DC converter 40 in either case when the terminal voltage of the dc voltage source S2 is higher than the instant voltage of the battery B2 or when the latter voltage exceeds a predetermined reference voltage. The other configurations and operations are identical to those of the second embodiment, and therefore like numeral are repeated to designate like parts. A voltage dividing network of a zenor diode 75 and a resistor 76 is connected across the dc voltage source S2 to provide a fixed reference voltage which is fed to the inverted input of an additional comparator 80 which, at the non-invertd input, receives the first output indicative of the instant voltage of the battery B2 from the first voltage dividing network of resistors 71 and 72. Thus, the additional comparator 80 provides a high-level output to one of the inputs of an OR-gate 81 when the voltage of the battery B2 exceeds the fixed reference voltage determined by the zenor diode 75, which condition is indicative of the the battery B2 being over-charged to an unacceptable level. The other input of the OR gate 81 is connected to the comparator 70 which compares the terminal voltage of the dc voltage source S2 with the instant voltage of the battery B2 as described previously so that the OR gate 81 provides a high-level output to the base of the shunting transistor 68 either when the battery B2 is in over-charged condition or when the dc power source S2 has the voltage higher than the instant voltage of the battery B2. In response to such high-level output, the shunting transistor 68 operates in the same manner as in the second embodiment to inhibit the DC-to-DC converter 40, preventing excess charge current from flowing into the battery B2 on one hand, and preventing any additional voltage or charge current from being applied to the fully charged battery to safely cease the charging operation, on the other hand.

In this way, the battery B2 can be protected from unduly high charge current as well as from over-charging, both of which conditions are harmful to the battery B2 and should be eliminated for assuring safe charging of the battery.

Third Embodiment

Figure 6:
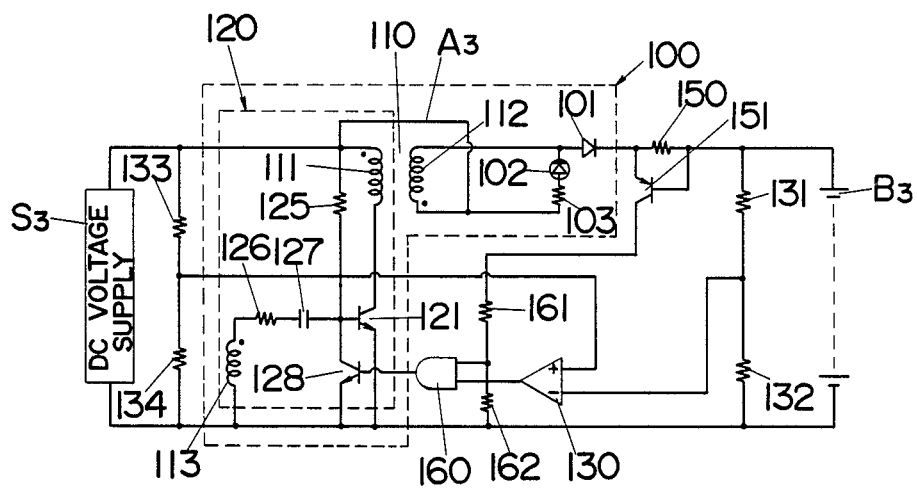
FIG. 6 is a circuit diagram of a battery charger in accordance with a third preferred embodiment of the present invention.

Referring to FIG. 6, there is shown a third embodiment of the present invention which is generally similar to the second embodiment but further includes a useful arrangement of controlling a battery charger in an effective manner to shorten the overall charging time when a battery B3 is initially charged directly from the dc voltage source S3 as inhibiting to apply the induced voltage, in addition to prevent the occurrence of excessively large charge current drawn to the battery B3. Likewise in the second embodiment, the battery charger of this embodiment comprising a DC-to-DC converter 100 of the like configuration including a step-down transformer 110 with its primary winding 111 connected to a dc voltage source S3 and with its secondary winding 112 connected through a rectifier diode 101 to the battery B3 to be charged. A switching transistor 121 is connected in circuit with the feedback winding 113 of the transformer 110 and an R-C network of a starting resistor 125, resistor 126, and a capacitor 127 so as to constitute a blocking oscillator 120 of the same operation as in the second embodiment. The secondary winding 112 is connected in series with the dc voltage source S3 through a line A3 so as to add the induced voltage developed across the secondary winding 112 to the dc voltage source S3.

A comparator 130 has its inputs connected respectively to a first voltage dividing network consisting of resistors 131 and 132 and to a second voltage divider network consisting of resistors 133 and 134 for comparing the terminal voltage of the dc voltage source S3 with the instant voltage of the battery B3. A current sensing resistor 150 which is connected in series between the rectifier diode 101 and the positive side of the battery B3 for constantly monitoring the level of the charge current drawn to the battery B3. Cooperative with the current sensing resistor 150 is a transistor 151 which has its emitter and base connected across the current sensing resistor 150 so that it provides to one input of an AND-gate 160 a collector output divided by a combination of resistors 161 and 162. The AND-gate 160 has the other input connected to the comparator 130 and has its output connected to the shunting transistor 128 inserted in the base-emitter path of the switching transistor 121.

The transistor 151 thus coupled with the current sensing resistor 150 operates to provide the high-level signal so long as the charge current is maintained at a level above a threshold level determined by the current sensing resistor 150, and provide a low-level signal when the charge current is decreased down to the threshold level. The threshold level is selected to be rather smaller than a normally expected charge current level so that the transistor 151 produces the high-level output in the normal charging condition and produces the low-level output only when the charge current decreases to a smaller extent.

Figure 7:
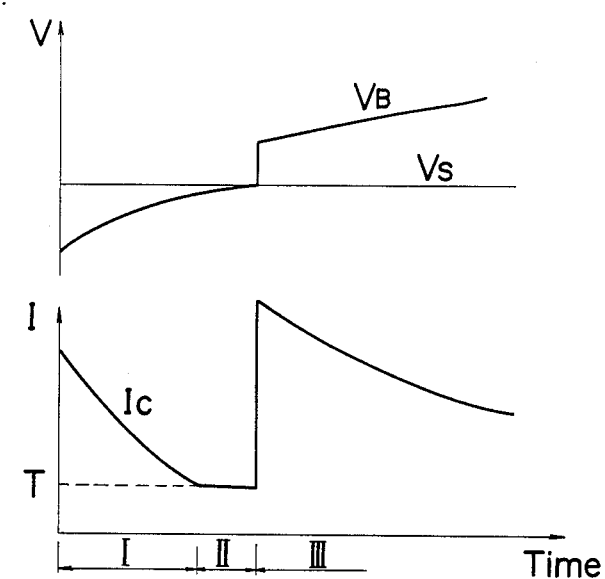
FIG. 7 is a waveform chart indicating the operation of the circuit of FIG. 6.

Considering that the shunting transistor 128 is controlled to render the switching transistor 121 inoperative, or to inhibit the oscillation of the DC-to-DC converter 100 only when the AND-gate 160 receives the high-level signal both from the transistor 151 and the comparator 130, the only case that the DC-to-DC converter 100 is inhibited its operation is when the dc voltage source S3 has the higher voltage than the instant voltage of the battery B3 and at the same time the charge current drawn due to the voltage difference therebetween is higher than the threshold level. The operation is now explained with reference to FIG. 7 which is the timing chart illustrating the waveforms of the varying battery voltage and the charge current drawn thereto. So long as the dc voltage source S3 has its terminal voltage Vs higher than the instant voltage Vb of the battery B3 and at the same time sufficient charge current Ic is drawn to the battery B3 (stage I), the DC-to-DC converter is kept inoperative so that the battery B3 can be charged only from the higher dc voltage source S3 by better utilization of the voltage difference therebetween, and once the charge current Ic decreases down to an insufficient level as a result of the instant voltage of the battery B3 approaching the fixed voltage of the dc voltage source S3, the transistor 151 is switched to provide the low-level output to actuate the DC-to-DC converter 100. Upon this occurrence the induced voltage of the DC-to-DC converter 100 is added to the dc voltage source S3 so as to compensate for the further decrease in the charge current Ic and consequently maintain charge current Ic at a minimum level of the threshold level T for successfully continuing the charging of the battery B3 as repeatedly changing the output from the transistor between high- and low-level signals until the battery B3 is charged up to the voltage level equal to that of the dc power source S3 (stage II). When the charging is advanced further (stage III), the comparator 130 no longer provides the high-level signal to the AND gate 160 to disable the shunting transistor 128 so that the DC-to-DC converter 100 cannot be inhibited its operation notwithstanding that the charge current Ic is maintained at a level higher than the threshold level T, or the high-level signal is constantly produced at the collector output of the transistor 151, allowing the further charging process to advance effectively by the help of the induced voltage developed by the DC-to-DC converter 100.

It is to be noted at this time that the threshold level T also determines a maximum allowable charge current for the battery B3 which is the sum of the fixed charge current expected from the induced voltage developed and the threshold level. This means that the DC-to-DC converter 100 is kept inoperative so as not to apply the induced voltage to add an extra current to the charge current from the dc voltage source S3 while it is at a sufficiently high level above the threshold level T, preventing the charge current Ic from being increased to the level exceeding the maximum charge current. That is, the induced voltage can serve to add the charge current only after the charge current Ic is decreased to the threshold level T where the total charge current can be within the maximum charge current level. In this sense, the battery can be protected from receiving excessively higher charge current also in this embodiment, yet assuring the effective charging technique to reduce the total charging time when the battery B3 is initially charged solely from the dc voltage source S3 by the voltage difference therebetween. This is because that the DC-to-DC converter 100 can start its operation of adding the induced voltage to the dc voltage source S3 well before the charge current Ic drawn from the dc voltage source S3 is decreased to such a low level at which the battery B3 can be further charged up only with the elapse of a considerably extended time. In fact, the charge current solely resulting from the voltage difference between the dc voltage source S3 and the battery B3 eventually approaches to zero in the vicinity of which effective charging is no longer expected with such extremely low current level.

What is claimed is:

1. In a battery charger for charging a battery from a dc voltage source which comprises a DC-to-DC voltage converter connected between the dc voltage source and the battery to be charged,
said DC-to-DC voltage converter comprising:
a transformer having a primary winding connected to the dc voltage source and having a secondary winding connected to the battery;
switching means connected in series with the primary winding of the transformer and so controlled as to be alternately turned on and off for developing across the secondary winding an induced ac voltage;
rectifying means rectifying the induced ac voltage into the dc voltage which is applied to the battery for supplying a charge current into the battery, wherein said rectifying means is a half-wave rectifier diode which is connected in circuit with an anode coupled to one end of the secondary winding of said transformer and with a cathode coupled to the positive side of the battery; a resistor and an over-charge indicator connected in series, said over-charge indicator being a light emitting diode which is connected with its anode coupled to said resistor which is coupled to the positive side of the battery and said over-charge indicator having its cathode connected to the other end of the secondary winding of the transformer so as to produce an alarm light indicative of current drawn back to the dc power source from the battery being charged when the battery is charged up to a voltage level above a reference level determined by said resistor in series with the over-charge indicator;
said secondary winding being connected in series with the dc voltage source in such a manner that the dc voltage obtained by rectifying the ac voltage induced across the secondary winding of the transformer is in an additive relation with the terminal voltage of the dc voltage source which is applied to the battery for charging the battery.

2. In a battery charger for charging a battery from a dc voltage source which comprises a DC-to-DC voltage converter connected between the dc voltage source and the battery to be charged,
said DC-to-DC voltage converter comprising:
a transformer having a primary winding connected to the dc voltage source and having a secondary winding connected to the battery;
switching means connected in series with the primary winding of the transformer and so controlled as to be alternately turned on and off for developing across the secondary winding an induced ac voltage;
rectifying means rectifying the induced ac voltage into the dc voltage which is applied to the battery for supplying a charge current into the battery,
said secondary winding being connected in series with the dc voltage source in such a manner that the dc voltage obtained by rectifying the ac voltage induced across the secondary winding of the transformer is in an additive relation with the terminal voltage of the dc voltage source which is applied to the battery for charging the battery; and
control means for inhibiting the DC-to-DC converter in response to the terminal voltage of the dc power source being higher than the instant voltage of the battery being charged so as to allow the direct charging of the battery from the dc power source so long as the terminal voltage is higher than the instant voltage of the battery being charged.

3. In a battery charger for charging a battery from a dc voltage source which comprises a DC-to-DC voltage converter connected between the dc voltage source and the battery to be charged,
said DC-to-DC voltage converter comprising:
a transformer having a primary winding connected to the dc voltage source and having a secondary winding connected to the battery;
switching means connected in series with the primary winding of the transformer and so controlled as to be alternately turned on and off for developing across the secondary winding an induced ac voltage;
rectifying means rectifying the induced ac voltage into the dc voltage which is applied to the battery for supplying a charge current into the battery,
said secondary winding being connected in series with the dc voltage source in such a manner that the dc voltage obtained by rectifying the ac voltage induced across the secondary winding of the transformer is in an additive relation with the terminal voltage of the dc voltage source which is applied to the battery for charging the battery; and
control means for inhibiting the DC-to-DC converter in response to the terminal voltage of the dc power source being higher than the instant voltage of the battery being charged or the voltage of the battery being higher than a predetermined reference level.

4. In a battery charger for charging a battery from a dc voltage source which comprises a DC-to-DC voltage converter connected between the dc voltage source and the battery to be charged, said DC-to-DC voltage converter comprising:

a transformer having a primary winding connected to the dc voltage source and having a secondary winding connected to the battery;

switching means connected in series with the primary winding of the transformer and so controlled as to be alternately turned on and off for developing across the secondary winding an induced ac voltage;

rectifying means rectifying the induced ac voltage into the dc voltage which is applied to the battery for supplying a charge current into the battery, said secondary winding being connected in series with the dc voltage source in such a manner that the dc voltage obtained by rectifying the ac voltage induced across the secondary winding of the transformer is in an additive relation with the terminal voltage of the dc voltage source which is applied to the battery for charging the battery; and control means for inhibiting the DC-to-DC converter only when the terminal voltage of the dc power source being higher than the instant voltage of the battery being charged and at the same time the charge current to the battery exceeds above a predetermined threshold level.

5. In a battery charger having a DC-to-DC converter for charging a battery from a dc voltage source, said DC-to-DC converter being connected between the dc voltage source and the battery to be charged and comprising:

a transformer having a primary winding, a secondary winding, and a feedback winding, the primary winding connected to the dc voltage source, and the secondary winding connected to the battery;

a switching transistor connected in series with the primary winding of the transformer, an R-C network connected to the switching transistor and to the feedback winding to form a blocking oscillator by which oscillation the switching transistor is alternately turned on and off for developing an induced ac voltage across the secondary winding of the transformer; and a rectifying diode connected in series with the secondary winding for rectifying the induced ac voltage developed across the secondary winding for supplying a charge current to the battery;

said secondary winding being connected in series with the dc voltage source in such a manner that the induced voltage of the transformer is in an additive relation with the terminal voltage of the dc voltage source;

a shunting transistor connected in the base-emitter path of the switching transistor;

a first comparator comparing the terminal voltage of the dc voltage source with the instant voltage of the battery to provide a first output when the former voltage exceeds the latter voltage;

a second comparator comparing the terminal voltage of the battery with a predetermined reference voltage to provide a second output when the former voltage exceeds the latter voltage; and gate means connected to the first and second comparators to provide a trigger output to the base of the shunting transistor upon receiving any one of the first and second outputs, said shunting transistor being in response to the trigger output to shunt the base-emitter path of the switching transistor, inhibiting the oscillation of the DC-to-DC converter.

6. In a battery charger having a DC-to-DC converter for charging a battery from a dc voltage source, said DC-to-DC converter being connected between the dc voltage source and the battery to be charged and comprising:

a transformer having a primary winding, a secondary winding, and a feedback winding, the primary winding connected to the dc voltage source, and the secondary winding connected to the battery;

a switching transistor connected in series with the primary winding of the transformer, an R-C network connected to the switching transistor and to the feedback winding to form a blocking oscillator by which oscillation the switching transistor is alternately turned on and off for developing an induced ac voltage across the secondary winding of the transformer; and a rectifying diode connected in series with the secondary winding for rectifying the induced ac voltage developed across the secondary winding for supplying a charge current to the battery;

said second winding being connected in series with the dc voltage source in such a manner that the induced voltage of the transformer is in an additive relation with the terminal voltage of the dc voltage source;

a shunting transistor connected in the base-emitter path of the switching transistor;

a comparator comparing the terminal voltage of the dc voltage source with the instant voltage of the battery to provide an output to the base of the shunting transistor when the former voltage exceeds the latter voltage;

a current sensing resistor connected between the rectifier diode and the positive side of the battery;

a transistor having its emitter and base connected across the current sensing resistor so as to provide a feedback output when the current sensing resistor sees the charge current of a level exceeding a predetermined threshold level; and gate means connected to the comparator and the transistor to provide a trigger output to base of the shunting transistor only when it receives both the output from the comparator and the feedback output from the transistor, said shunting transistor being in response to the trigger output from the gate means to shunt the base-emitter path of the switching transistor, inhibiting the oscillation of the DC-to-DC converter.

* * * * *